United States Patent [19]

Younger

[11] Patent Number: 4,711,140

[45] Date of Patent: Dec. 8, 1987

[54] THROTTLE VALVE SYSTEM FOR AUTOMATIC TRANSMISSIONS

[76] Inventor: Gilbert W. Younger, 2621 Merced Ave., El Monte, Calif. 91733

[21] Appl. No.: 813,729

[22] Filed: Dec. 27, 1985

[51] Int. Cl.$^4$ .................... B60K 41/06; B60K 41/16
[52] U.S. Cl. ........................................ 74/865; 74/867
[58] Field of Search ............... 74/856, 861, 862, 865, 74/867, 870

[56] References Cited

U.S. PATENT DOCUMENTS

| | | | |
|---|---|---|---|
| 2,733,732 | 2/1956 | Baker | 74/867 X |
| 4,274,305 | 6/1981 | Roushdy | 74/865 |
| 4,291,595 | 9/1981 | Jelaca | 74/856 X |
| 4,331,046 | 5/1982 | Leonard et al. | 74/867 |
| 4,391,166 | 7/1983 | Kubo et al. | 74/867 X |
| 4,406,181 | 9/1983 | Kubo et al. | 74/867 X |
| 4,449,426 | 5/1984 | Younger | 74/867 |
| 4,476,746 | 10/1984 | Miki et al. | 74/867 |
| 4,598,612 | 7/1986 | Ideta | 74/867 |

FOREIGN PATENT DOCUMENTS

| | | | |
|---|---|---|---|
| 1137544 | 5/1957 | France | 74/861 |
| 1142433 | 9/1957 | France | 74/867 |
| 146942 | 9/1982 | Japan | 74/867 |

*Primary Examiner*—Leslie Braun
*Assistant Examiner*—Joseph M. Rolnicki
*Attorney, Agent, or Firm*—Mark P. Stone; F. Eugene Davis, IV

[57] ABSTRACT

The present invention provides an improved throttle valve regulating system for automatic transmissions for motor vehicles. In such automatic transmissions, the throttle valve reciprocates in a bore as a result of the action of a plunger and a throttle valve spring to control the flow and pressure of transmission fluid or oil to effect gear shifting. The present improvement provides a rigid spacing element of predetermined length received within the throttle valve spring for urging the valve towards a full throttle position in the event that the valve sticks in the bore in a lower throttle position. The system further includes a high rate spring located in the full throttle position in the bore to prevent sticking of the valve in that position, and a low rate spring similarly positioned in the bore to counteract the force of the throttle valve spring for returning the throttle valve to a low throttle or zero position. The reciprocating throttle valve includes at least one land or circumferential flange having sharpened edges for shearing large particles or other impurities introduced into the bore with the transmission fluid which might otherwise become wedged between the valve and the bore and cause sticking of the valve in a fixed position in the bore.

13 Claims, 4 Drawing Figures

FIG. 3
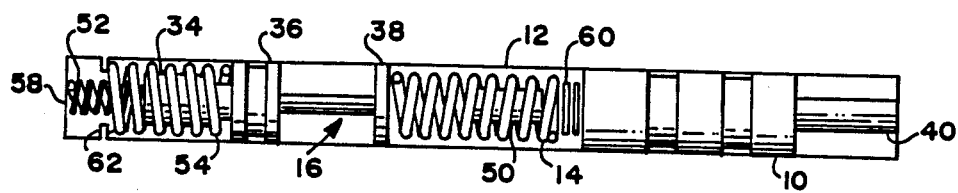
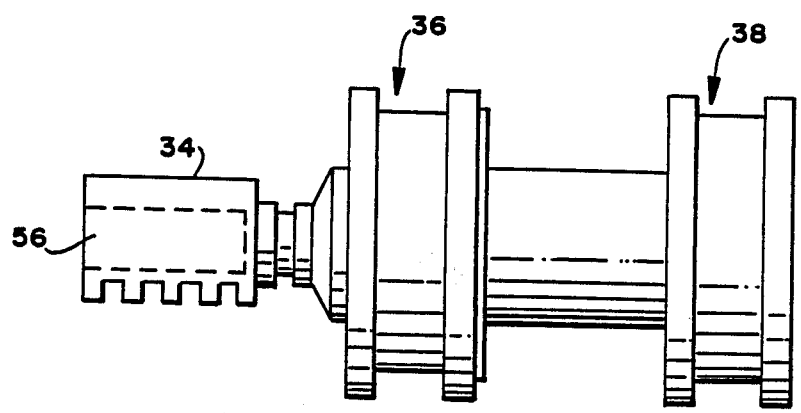
FIG. 4

THROTTLE VALVE SYSTEM FOR AUTOMATIC TRANSMISSIONS

BACKGROUND ART

The subject matter of the present invention relates to automatic transmissions for motor vehicles. More specifically, it relates to an improved throttle valve system for an automatic transmission which is specifically designed to eliminate sticking of the valve as it reciprocates in its bore.

Generally speaking, automatic transmissions for motor vehicles include various gear arrangements with appropriate clutch plates and bands responsive to hydraulic oil pressure to effect shifting of the gears in response to the speed of the vehicle. A valve body and casing form the basic elements of the automatic transmission. The valve body and casing contain various inter-related passages, valves, springs and orifices such that the valve body receives signals in the form of hydraulic pressures which route transmission oil through appropriate passages in the casing to clutch plates and bands to automatically effect sequential shifting of gears. The valve body itself cooperates with a separator plate disposed between the valve body and the casing. The separator plate includes orifices and openings of different size which communicate with inter-related passages in the valve body and casing to route oil through the transmission and ultimately effect gear shifting. For a fuller discussion of the valve body, and separator plate, and the manner in which these elements cooperate in an automatic transmission, attention is respectfully directed to U.S. Pat. No. 4,449,426 issued to the present applicant on May 22, 1984.

An essential component of the valve body of an automatic transmission is the throttle valve system. As is well known in the art, the throttle valve of an automatic transmission regulates the flow of transmission oil through the valve body. More specifically, the throttle valve reciprocates in a bore or sleeve, and the position of the throttle valve is controlled by the depression of the accelerator pedal of a motor vehicle through an appropriate linkage system. The throttle valve may be moved between a first zero or low throttle position and a second high or full throttle position. The position of the throttle valve in the bore regulates the flow of transmission oil by blocking or permitting fluid flow through different openings defined in the bore. The basic operation of the throttle valve is well known to those skilled in the art.

One major cause of automatic transmission failure results from the sticking of the throttle valve in its bore. If the throttle valve becomes stuck in the bore and fails to reciprocate in relation to accelerator pedal depression, the transmission system receives an inaccurate pressure signal resulting in slippage and clutch and band failure. Sticking of the throttle valve is most commonly caused by particles or other contaminants introduced into the system and circulated by the transmission oil itself. Any particles or other matter having a largest dimension greater than the clearance provided between the periphery of the throttle valve and its bore may potentially become wedged therebetween. Such wedging is the principal cause for the sticking of the throttle valve and thus is a significant factor in automatic transmission failure.

It is an object of the present invention to overcome the problem of sticking of throttle valves by providing an improved throttle valve system capable of shearing particles which may become wedged to a size in which they no longer are capable of wedging between the valve and its bore.

It is a further object of the invention to provide an improved throttle valve system which provides positive additional force applied to the throttle valve only at such times when that valve is stuck.

It is a further object of the invention to provide an improved throttle valve system which alerts a driver with a positive physical indication when the valve becomes stuck.

Other objects and advantages of the improved throttle valve system will become apparent in the following discussion of the improved system.

SUMMARY OF THE INVENTION

A throttle valve system for an automatic transmission for a motor vehicle includes a slidable throttle valve member reciprocally movable in a bore for regulating the flow of transmission oil. The valve member is moved in the bore by a spring mounted to one end thereof, and the spring is urged by a plunger acting at its other end. The plunger is coupled to the accelerator pedal of the vehicle through appropriate linkage so that depression of the accelerator pedal moves the valve member in the bore between a low throttle position and a full or wide open throttle position. A spacer element, preferably formed from a durable metal such as steel, is freely positioned within the throttle valve spring. The length of the spacer element is less than the length of the throttle valve spring when the spring is in a relaxed position. In the event that the spring becomes compressed to less than a predetermined length, (which length is defined by the length of the spacer element therein) as will occur when valve member sticks in the bore, the spacer member itself is urged directly against one end of the stuck valve by the action of the plunger thereon to free the valve.

In other aspects of the invention, the valve member defines lands or flanges around its periphery having edges which are sufficiently sharp to shear large sized particles which might otherwise become wedged between the valve member and the inner surface of the bore to cause sticking of the valve in the bore. A high rate compression spring is located in the wide open throttle position of the bore and is provided to prevent the valve member from bottoming or abutting against the end wall of the bore which might also result in sticking of the valve in that position. A low rate compression spring is similarly located in the wide open throttle position of the bore to assist the valve member in its return to the zero or low throttle position when pressure on the accelerator pedal is relieved.

BRIEF DESCRIPTION OF THE DRAWINGS

FIG. 3 is a schematic view of the components illustrated by FIG. 2 in their operative position; and FIG. 4 is a detailed illustration of an improved throttle valve member in accordance with the present invention.

DISCUSSION OF THE PREFERRED EMBODIMENT OF THE INVENTION

Figure 1:
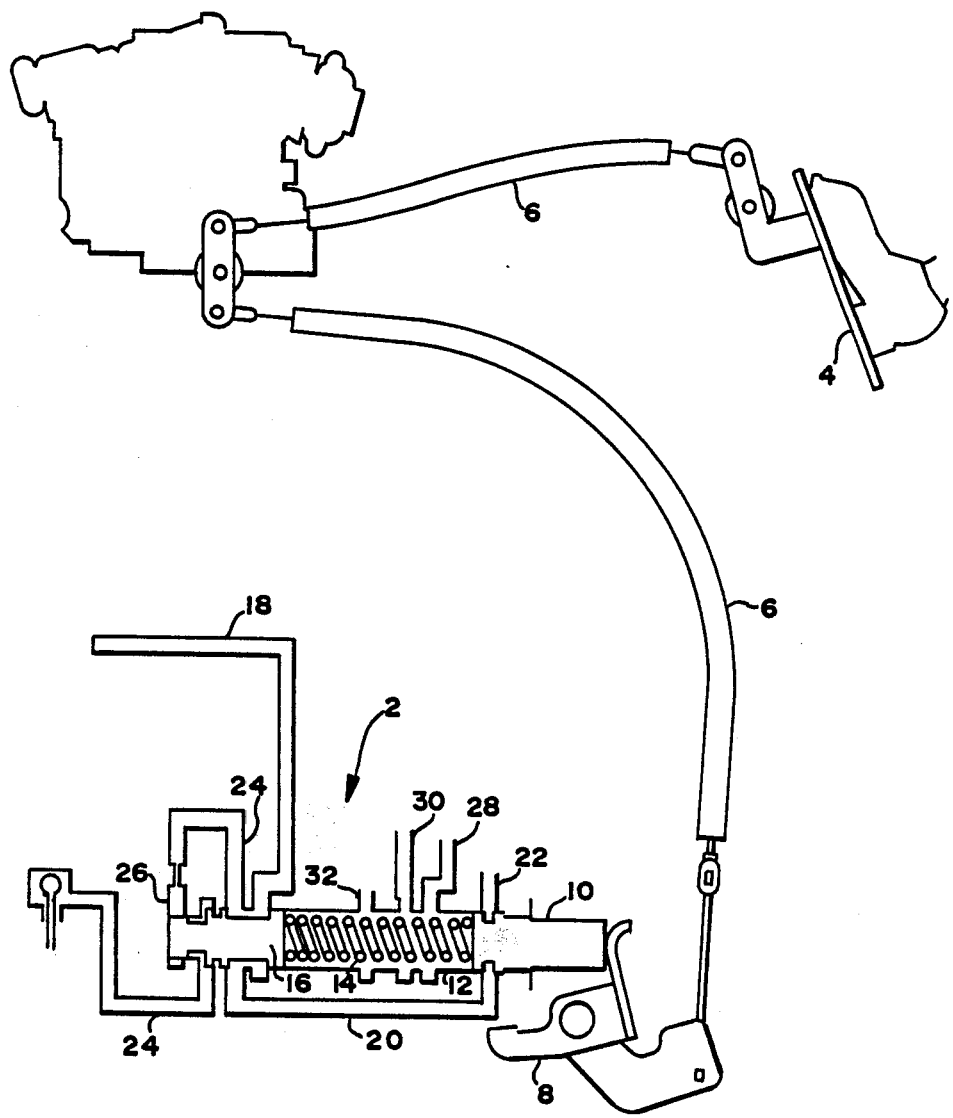
FIG. 1 of the drawings illustrates a schematic view of a throttle valve system for automatic transmissions for motor vehicles.

The specific details of the improved throttle valve system for automatic transmissions will now be discussed with reference to FIGS. 1-4 of the drawings. FIG. 1 illustrates a schematic view of a throttle valve system coupled to an accelerator pedal of a motor vehicle, as for example an automobile. The throttle valve system, illustrated generally by the reference numeral 2, connected to an accelerator pedal 4 via a conventional linkage system generally designated by the reference numeral 6. As the accelerator pedal is depressed, a cam 8 urges a throttle valve plunger 10 in a leftward direction as shown in FIG. 1. The plunger is reciprocally movable in a bore 12 under the urging of the cam. The end of the plunger remote from the cam is coupled to one end of a throttle valve compression spring 14. A throttle valve member 16 is coupled to the other end of the compression spring 14 so that the compression spring is disposed between the plunger 10 and the throttle valve member 16.

It is apparent from the above-described arrangement that the throttle valve member itself is reciprocally movable within the bore 12 under the direction and urging of the plunger 10 and the compression spring 14. As the plunger is urged towards the left by the cam 8, the throttle valve spring 14 is compressed and exerts a leftwardly directed force on the throttle valve member 16 to move that member in a leftward direction as shown in FIG. 1. The position of the throttle valve 16 in FIG. 1 is at wide open throttle, namely at or near the leftmost position in the bore 12. If the presssure on the accelerator pedal 4 is relieved, the linkage and the cam will urge the plunger 10 in a rightward direction. As the plunger moves rightward, the throttle valve spring 14 exerts no force on the valve member 16. Oil pressure introduced through bore 26 then causes the valve to move rightwardly in the bore 12. Accordingly, when the throttle valve system is operating properly, the position of the throttle valve member in the bore is controlled by the extent to which the accelerator pedal 4 is depressed. The throttle valve is reciprocally movable under the urging of the plunger 10 and the compression spring 14 between a full throttle (left most) position and a lift or zero throttle (rightmost) position in the bore 12.

As is known to those skilled in the art, the throttle valve system includes a source line 18 coupled to a source of transmission oil or fluid. A fluid line 20 is also provided to enable the hydraulic fluid to flow from the source line 18 to a throttle valve opening or duct 22, provided that source line is not obstructed by the position of the throttle valve 16. The throttle valve system also includes an exhaust line 24 disposed above and below the throttle valve 16, and a balance oil line 26 adapted to provide a portion of the hydraulic fluid to the left most end of the throttle valve as shown in FIG. 1. In operation of the throttle valve system, the position of the valve relative to the source line 18 determines the extent of flow of hydraulic fluid from the source through the line 20 and out the duct 22. The pressure of the hydraulic fluid flowing out the duct 22 ultimately controls the shifting of the transmission. Accordingly, shifting of the transmission is controlled by the plunger and the spring which control the position of the throttle valve 16. The plunger 10 is constructed so that at no time does it obstruct the flow of hydraulic fluid from line 20 out the duct 22. This may be accomplished, by providing the plunger with a larger head portion which is always positioned to the left of the duct 22 by stop means, and a narrower shaft extending rightwardly from the larger head, the cam 8 acting upon this narrow shaft. Accordingly, only the narrow shaft, which does not substantially obstruct fluid flow, is disposed between line 20 and duct 22 at all times.

Although not directly relevant to the present invention, it is noted that the bore 12 includes additional ducts 28, 30, and 32. As the plunger 10 advances to the left in FIG. 1, ducts 28, 30 and 32, in addition to throttle valve duct 22, communicate with hydraulic fluid flowing through line 20. Thus, when the plunger is in its left most position, hydraulic fluid flows simultaneously through ducts 22, 28, 30 and 32. The hydraulic fluid flow through ducts 28, 30 and 32 perform functions not directly relevant to the subject matter of the present invention.

As is evident from the above discussion, the reciprocating movement of the throttle valve member 16 in the bore 12 is critical to the proper operation of an automatic transmission. If the valve malfunctions by sticking in a fixed position within the bore, fluid flow and pressure through the duct 22 will be incorrect for vehicle operating conditions, thereby providing an inaccurate pressure signal to the transmission. Accordingly, the state of operation of the transmission will not correspond to actual engine torque and transmission failure is likely. A significant cause of stuck throttle valves results from the wedging of particles or other impurities between the outer surface of the valve member and the inner surface of the bore in which it moves.

Figure 2:
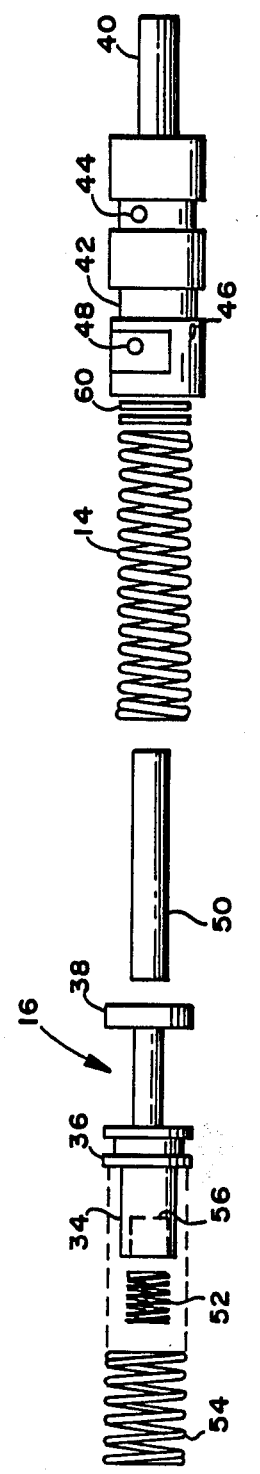
FIG. 2 of the drawings is an exploded view illustrating the different components of the improved throttle valve system in accordance with the present invention.

FIG. 2 of the drawings illustrates an exploded view of the components of the throttle valve system including the improvements provided by the present invention. The throttle valve 16 includes a plurality of lands or flanges 34, 36, and 38. The throttle valve compression spring 14 is disposed to the right of the valve member, and the shaft of 40 of the plunger 10 (generally illustrated in FIG. 1) is shown extending from the right of a sleeve 42. The sleeve includes openings 44, 46, and 48 which correspond to the ducts 22, 28, and 30 illustrated in FIG. 1. The plunger includes a head (not shown) having a diameter substantially equivalent to the inner diameter of the sleeve 42 so that the plunger is movable in the sleeve. The plunger head is always maintained to the left of opening 44 in the sleeve by suitable stop means. Accordingly, the head of the plunger does not obstruct opening 44 through which hydraulic fluid may flow.

A spacer element or member 50, preferably a cylindrical steel rod, is received within the throttle valve spring 14. The length of the spacer element 50 is less than the length of the throttle valve spring 14 when this spring is in its normal unstressed state. As also illustrated by FIG. 2, a high rate compression spring 52 and a larger diameter low rate compression spring 54 are positioned to the left of throttle valve 16. As will be explained more fully below, springs 52 and 54 are mounted in the bore in which the throttle valve reciprocates proximate to the full throttle position of the valve. Spring 52, which is received within spring 54, acts on the left end of land 34 while spring 54 acts on the left end of the larger land 36. The diameter of the low rate spring 54 is sufficiently large to permit the smaller land 34 of the throttle valve 16, to be received within the low rate spring 54 while this spring acts on the larger diameter land 36.

FIG. 3 of the drawings illustrates a schematic view of the components of the throttle valve system discussed in FIG. 2 in their assembled position. The various openings and ducts illustrated in FIGS. 1 and 2 have been omitted for purposes of clarity. FIG. 3 shows the plunger 10 driving the throttle valve 16 via the intermediate throttle valve compression spring 14. The spacer element 50 which is of a length less than the length of the throttle valve spring in its uncompressed state, is positioned freely within the throttle valve spring and does not abut against the throttle valve member 16 or the plunger 10. If the system is operating properly, the throttle valve is moved in the bore 12 toward the left (full throttle position) only by the urging of the throttle valve spring 14 acting on the right end of the valve member 16. The leftmost end of the bore 12 is designated by reference numeral 58. The spring characteristic of the throttle valve spring and the length of the spacer member 50 are selected such that the spring will move the valve towards the left but not be compressed to a length equal to the smaller length of the spacer member 50. Accordingly, under normal operating conditions, the spacer member 50 will not be urged against the valve member 16.

In the event that the valve becomes stuck in the bore and cannot be moved further left by the force of the spring 14, the action of the plunger urging the spring to the left will compress the throttle valve spring because the stuck throttle valve member 16 remains stationary within the bore. When the spring is compressed such that its length equals that of the spacer element 50, the plunger head will now directly exert a force on the right end of the spacer element 50. Likewise, the left end of the spacer element 50 is forced directly against the right end of land 38 of the valve member 16. Accordingly, as the plunger 10 is urged further to the left, the spacer member 50 is forced directly against the valve member 16 to free it from its stuck position. As noted, the spacer member is formed from a solid durable material, as for example steel. The force exerted on a valve member by the spacer element supplements the force still being exerted by the throttle valve spring 14 on the valve members and should, in most instances, be sufficient to free the stuck valve. Once the valve is freed and may move to the left in the bore, the compression spring expands to its normal length which is greater than the length of the spacer element 50. Accordingly, the spacer element again becomes freely seated within the throttle valve spring and no longer exerts a force on the valve member 16. Thus, it is apparent that the supplemental force to free a stuck valve provided by the spacer element 50 is provided only for as long as the valve remains stuck. Once the valve is freed by the supplemental force, the spacer element returns to its inoperative resting position and remains freely seated within the throttle valve spring.

The use of the spacer element 50, as described above, supplements the force provided by throttle valve spring 14 to free a stuck valve in the event that the valve sticks as it is being moved toward its leftward full throttle position. In the event that the valve cannot be freed even by the supplemental force of the spacer element 50, the spacer element still provides an important function by providing a driver with a perceivable indication that a problem exists. As discussed, the plunger 10, which drives the throttle valve spring 14, is coupled by linkage to the accelerator pedal of the vehicle. In the event that the throttle valve sticks and cannot be freed even by the supplemental force of the spacer element 50, the driver of the vehicle will realize the existence of a problem because the urging of the spacer element 50 against the stationary stuck valve member will be sensed by the driver as a physical resistance to further depression of the accelerator pedal. The abutment of the spacer element 50 against the stuck valve will, oppose further depression of the accelerator pedal until the valve is freed. Such indication will alert the driver that a problem exists and that immediate attention is necessary. Accordingly, the vehicle will not be driven to any great extent with the valve 16 in a stuck position thereby minimizing the potential for permanent damage to the transmission system.

As illustrated in FIG. 3 of the drawings, a high rate compression spring 52 is mounted in the end of the bore 12 proximate to the full throttle position of the throttle valve 16. Spring 52 is dimensioned and positioned to abut the end of the valve member 16 when the valve approaches its full throttle position. As will be explained with reference to FIG. 4, spring 52 is configured to be received within an opening defined within land 34. In this manner, the valve will never abut directly against the end of the bore and will not become stuck in that position. As noted above, a primary cause for sticking of throttle valves occurs as a result of wedging of particles or impurities between the valve and the bore. Such particles may be introduced into the system with the transmission oil, and it is known that these particles tend to accumulate in the bore near the leftmost full throttle position of the valve. Accordingly, the high rate spring 52 prevents the valve from entering this region and thereby reduces the potential for the valve becoming stuck in this position.

A low rate spring 54 is mounted to the left of land 36 and abuts against a stop for land 36 which, for example may be the tapered end of a throttle valve sleeve, illustrated generally by reference numeral 62. The low rate spring is adapted to exert a rightwardly directed force against the left end of land 36 of the throttle valve 16 at all times. Stop 62 includes a central opening allowing land 34 and spring 52 to pass therethrough so that spring 52 may abut the end 58 of bore 12. The force exerted by spring 54 and spring 52 opposes the force exerted by the throttle valve spring 14 to balance the overall force exerted on the throttle valve as it is being moved towards the full throttle position. Moreover, spring 54 returns the valve to its rightward or zero throttle position when such is desired.

The high rate spring 52 is smaller in diameter and length than the low rate spring 54. Spring 14 is redesigned in length and rate or by shimming with spacers 60 to balance the low rate spring 54 at the actual point of oil pressure regulation.

FIG. 4 of the drawings illustrates a detailed view of the throttle valve member 16. It is significant to note that the edges of lands 36 and 38 are intentionally sharpened. As discussed fully above, the primary cause for the sticking of a throttle valve in its bore is the wedging of particles between the outer surface of the valve and the inner surface of the bore. These particles are commonly introduced into the system with the hydraulic fluid flowing there through. The clearance between the larger lands 36 and 38 of the valve 16 and the inner surface of the bore 12 is typically of the order of about 0.001 inches. Therefore, a particle of that size or greater potentially may become wedged between the bore and the valve member and thus result in sticking of the valve. By designing the lands on the valve to intentionally define sharp edges, the valve itself is capable of functioning as a milling tool to cut or shear any particles wedged between the lands and the bore. As already discussed the force exerted on a valve which has become stuck in its movements towards full throttle position is supplemented by the additional force exerted by the spacer element 50. The increased force on the valve, together with the sharpened edges defined by the lands on the valve, will effectively shear or mill the wedged particle to a size which is no greater than the clearance between the lands and the bore. Accordingly, in addition to freeing a stuck valve, the sharpened edges on the valve cooperate with the supplemental force provided by the spacer element 50 to actually shear the particle which caused the sticking in the first instance. Because the sheared particle is now of a size which does not exceed the clearance between bore and a valve, this particle is incapable of again becoming wedged and will freely flow with the hydraulic fluid through the clearance between the valve and the bore.

The sharpened edges of the lands on the valve also perform a similar shearing or milling function if the valve becomes stuck as it is moving rightwardly toward its zero throttle position. In this instance, the low rate spring 54 supplements the force exerted on the valve during its rightward movement. The force on the valve together with the sharpened edges of the land on the valve tend to shear or mill larger size particles which may become wedged in the clearance during the rightward travel of the valve. Additionally, the force exerted by the high rate spring 52 and the low rate spring 54 supplements other rightwardly directed forces on the valve to assist in freeing a valve which may become stuck during its movement towards its zero throttle position. The low rate spring 54 serves one additional related function as it helps to assure that the throttle valve will return to its proper zero throttle position when desired. This zero throttle rightward position in the bore is another region in which particles or other impurities may tend to accumulate at times when the valve 16 is in its full throttle position towards the left of the bore. By assuring that the valve returns to its proper zero throttle position, the spring 54 causes the sharpened edges of the lands on the valve to shear or mill any particles which may accumulate in the zero throttle position of the bore. If the valve did not return to its proper zero throttle position, particles would continue to accumulate in this region increasing the potential for the sticking of the valve proximate to the zero throttle position. By assuring that the valve 16 is in the full rightward position during cruise or lift throttle, spacer 50 may then be utilized during the least throttle opening in the event that valve 16 sticks. In this manner, the valve 16 may be freed by the spacer at the lowest possible engine torque, thereby substantially reducing the risk of transmission failure due to the sticking of valve 16. Accordingly, the force exerted by springs 52 and 54 advantageously help return the valve to its rightward position during cruise operation so that the spacer 50 can immediately engage the valve at the zero throttle position if it sticks during cruise.

FIG. 4 also illustrates that the smaller left land 34 of the valve 16 defines a longitudinally oriented bore 56. This bore is aligned with, and of suitable dimension, to receive high rate spring 52 to control the position in the bore at which the spring 52 acts on the valve. In alternative embodiments of the invention, the spring 52 may be mounted in the bore 58 of the valve and not on the end wall 58 of the bore 12 in which the valve reciprocates.

It becomes apparent from the above discussion that the new throttle valve system includes several different aspects which cooperate with each other to provide an overall improved system that significantly reduces the possibility of the valve sticking in the bore. The spacer element 50 provides a force which supplements the force of the throttle valve spring to free a stuck valve as it moves towards its full throttle position. The spacer element additionally cooperates with sharpened edges intentionally defined on lands on the valve to shear or mill particles wedged within the clearance between the valve and the bore to assure that these particles will not again become wedged in the clearance. Likewise, the supplemental force exerted by the low rate spring 54 tends to free the valve which has become stuck in the bore during its rightward movements towards its lift or zero throttle position. The sharpened edges of the lands on the valve also cooperate with the supplemental force of spring 54 to shear or mill particles wedged in the clearance between the valve and the bore. The high rate spring 52 is provided to independently act upon the forward end of the valve member 16 to prevent this valve from striking or bottoming against the full throttle end of the bore, and also supplements the rightward force on the valve.

It is apparent that each individual aspects of the present invention provides an improvement to conventional throttle valve systems to significantly reduce the potential for the sticking of the valve in the bore. The preferred embodiment of the invention, which includes all aspects of the improved system discussed herein as they cooperate with each other, advantageously provides means for freeing stuck valves, shearing particles which cause the sticking to prevent subsequent sticking of the valve, and, in the worst case, providing a signal to the driver when the valve is stuck and cannot be freed.

The discussion of the preferred embodiments of the invention herein have been intended to be illustrative only and not restrictive of the scope of the invention, that scope being defined by the following claims and all equivalent thereto.

I claim:

1. A throttle valve system for automatic transmissions including a throttle valve member movable within a bore between two predetermined positions, a plunger for driving the throttle valve member in said bore, a throttle valve spring disposed between the plunger and the valve member for transmitting the force exerted by the plunger to the throttle valve member, and a rigid spacer element freely mounted within the throttle valve spring, said spacer element being of a length less than the length of said throttle valve spring when said spring is in its normal operative position, said spacer element adapted to exert a force directly on said throttle valve member if said valve member sticks in said bore and is no longer movable with said throttle valve spring, said spacer element directly abutting against said valve member and applying a force thereagainst, under the urging of said plunger, only if said valve member is stuck in said bore and said throttle valve spring is compressed to a length substantially equal to the length of said spacer element, said spacer element not directly abutting against said valve member during normal operation of said throttle valve system.

2. The improved system of claim 1 wherein said rigid spacer element is a metallic rod.

3. The improved system of claim 1 wherein said rigid spacer element is a metallic strip.

4. The improved throttle valve system of claim 1 wherein said throttle valve member includes at least one flange, said flange having sharpened edges adapted to shear particles wedged between said flange and the inner surface of said bore as said throttle valve member moves within said bore.

5. The improved throttle valve system of claim 1 further including a high rate spring adapted to act upon said throttle valve member and to exert a force thereon as said throttle valve member approaches one end of said bore to prevent said throttle valve member from striking said one end.

6. The improved throttle valve system as claimed in claim 5 further including a low rate spring adapted to exert a force on said throttle valve member as it approaches said one end of said bore to prevent said throttle valve member from striking said one end and to return said throttle valve member towards said other end of said bore.

7. The improved throttle valve system as claimed in claim 6 wherein said low rate spring is wider and longer than said high rate spring, and said low rate spring continues exerting said force after said high rate spring is fully extended.

8. The improved throttle valve system of claim 7 wherein said throttle valve member defines at least two separate flanges, said high rate spring adapted to act upon one of said flanges and said low rate spring adapted to act upon another of said flanges or seat therein.

9. The improved throttle valve system as claimed in claim 8 wherein said flange upon which said high rate spring acts defines an opening in alignment with said high rate spring, and said high rate spring is received within said opening as it acts upon said flange.

10. The throttle valve system as claimed in claim 1 further including means for maintaining said throttle valve in a zero throttle position during cruise or lift throttle operation so that said spacer element acts upon said throttle valve during least throttle opening if said throttle valve sticks in said zero throttle position.

11. A throttle valve system for automatic transmissions including a throttle valve member movable in a bore, a plunger for driving said throttle valve member in said bore, a throttle valve compression spring disposed between said plunger and said bore for transmitting forces from said plunger to said throttle valve member, and a rigid spacer element disposed within said throttle valve spring, said rigid spacer element having a length less than the length of said throttle valve spring in its non-compressed state and directly abutting against said valve member and applying a force thereagainst under the urging of said plunger only if said valve member sticks in said bore and does not move with said throttle valve spring, said spacer element not directly abutting against said valve member during normal operation of said throttle valve system, the outer surface of said throttle valve member and the inner surface of said bore defining a clearance therebetween, the outer surface of said throttle valve member having at least one sharpened edge for shearing particles wedged in said clearance.

12. The system as claimed in claim 11 further including resilient means acting upon said throttle valve member for preventing said throttle valve member from striking the ends of the bore in which it moves.

13. The throttle valve system as claimed in claim 12 wherein said resilient means return said throttle valve to a zero throttle position during cruise or lift throttle operation so that said spacer element acts upon said throttle valve, if stuck in said zero throttle position, during least throttle opening.

* * * * *

UNITED STATES PATENT AND TRADEMARK OFFICE
CERTIFICATE OF CORRECTION

PATENT NO. : 4,711,140

DATED : December 8, 1987

INVENTOR(S) : Gilbert W. Younger

It is certified that error appears in the above-identified patent and that said Letters Patent is hereby corrected as shown below:

Column 3, Line 50: Before "A fluid line 20", add --"A pump (not shown) supplies line 18 with such hydraulic fluid.--".

Signed and Sealed this

Seventh Day of June, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,711,140

DATED : December 8, 1987

INVENTOR(S) : Gilbert W. Younger

It is certified that error appears in the above-identified patent and that said Letters Patent is hereby corrected as shown below:

Claim 11, Line 5 (Column 10, Line 13): Delete "bore" and substitute --throttle valve member--.

Signed and Sealed this

Nineteenth Day of July, 1988

Attest:

DONALD J. QUIGG

Attesting Officer

Commissioner of Patents and Trademarks

REEXAMINATION CERTIFICATE (1953rd)

United States Patent [19]
Younger

[11] B1 4,711,140
[45] Certificate Issued  Mar. 23, 1993

[54] THROTTLE VALVE SYSTEM FOR AUTOMATIC TRANSMISSIONS

[76] Inventor: Gilbert W. Younger, 2621 Merced Ave., El Monte, Calif. 91733

Reexamination Request:
  No. 90/002,172, Oct. 22, 1990

Reexamination Certificate for:
  Patent No.: 4,711,140
  Issued:     Dec. 8, 1987
  Appl. No.:  813,729
  Filed:      Dec. 27, 1985

Certificate of Correction issued Jun. 7, 1988.

[51] Int. Cl.⁵ .................. B60K 41/06; B60K 41/16
[52] U.S. Cl. .................................. 74/865; 137/242; 74/867
[58] Field of Search .............. 74/856, 861, 862, 865, 74/867, 870; 137/242, 244

[56] References Cited

U.S. PATENT DOCUMENTS

| | | | |
|---|---|---|---|
| 2,896,478 | 7/1959 | Winchell | 74/867 |
| 4,331,046 | 5/1982 | Leonard et al. | 74/867 |
| 4,548,223 | 10/1985 | Kirkbride | 137/625.69 |

FOREIGN PATENT DOCUMENTS 1137544  5/1957  France .

OTHER PUBLICATIONS

THM 700R4—Principles of Operation (Second Ed.) General Motors 1983.
Turbo Hydramatic 700-R4 1982-1986 Fairbanks America, Inc.
Turbo Hydramatic 325—1979-1981 Fairbanks America, Inc.
Turbo Hydramatic 200—1976-1984 Fairbanks America, Inc.
Turbo Hydramatic 200 R4 Fairbanks America Inc.
Hydra-Matic THM 200 Systematic Trouble Shooting Manual, General Motors Corporation, Copyright 1977.
Transco's Turbo Hydra-Matic 200 Instruction Sheet, Copyright Transco 1980, 1981.
Motor Automatic Transmission Manual, 6th Ed., Copyright 1975.
Hydra-Matic THM 200 Principles of Operation, General Motors Corporation, Copyright 1975.

*Primary Examiner*—Dirk Wright

*Attorney, Agent, or Firm*—Mark P. Stone; F. Eugene Davis, IV

[57]  ABSTRACT

The present invention provides an improved throttle valve regulating system for automatic transmission for motor vehicles. In such automatic transmissions, the throttle valve reciprocation in a bore as a result of the action of a plunger and a throttle valve spring to control the flow and pressure of transmission fluid or oil to effect gear shifting. The present improvement provides a rigid spacing element of predetermined length received within the throttle valve spring for urging the valve towards a full throttle position in the event that the valve sticks in the bore in a lower throttle position. The system further includes a high rate spring located in the full throttle position in the bore to prevent sticking of the valve in that position, and a low rate spring similarly positioned in the bore to counteract the force of the throttle valve spring for returning the throttle valve to a low throttle or zero position. The reciprocating throttle valve includes at least one land or circumferential flange having sharpened edges for shearing large particles or other impurities introduced into the bore with the transmission fluid which might otherwise become wedged between the valve and the bore and causes sticking of the valve in a fixed position in the bore.

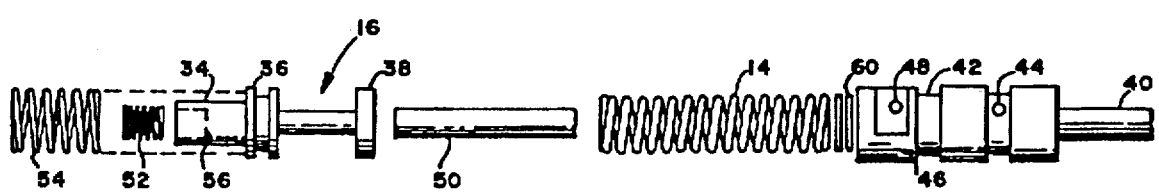

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, line 53–Column 5, line 2:

A spacer element or member 50, preferably a cylindrical steel rod *or a metallic strip*, is received within the throttle valve spring 14. The length of the spacer element 50 is less than the length of the throttle valve spring 14 when this spring is in its normal unstressed state. As also illustrated by FIG. 2, a high rate compression spring 52 and a larger diameter low rate compression spring 54 are positioned to the left of throttle valve 16. As will be explained more fully below, springs 52 and 54 are mounted in the bore in which the throttle valve reciprocates proximate to the full throttle position of the valve. Spring 52, which is received within spring 54, acts on the left end of land 34 while spring 54 acts on the left end of the larger land 36. The diameter of the low rate spring 54 is sufficiently large to permit the smaller land 34 of the throttle valve 16, to be received within the low rate spring 54 while this spring acts on the larger diameter land 36.

AS A RESULT OF REEXAMINATION, IT HAS BEEN DETERMINED THAT:

The patentability of claims 1–13 is confirmed.

New claims 14 and 15 are added and determined to be patentable.

*14. The improved throttle valve system of claim 1 further including a low rate spring adapted to exert a force on said throttle valve member as it approaches one end of said bore to prevent said throttle valve member from striking said one end and to return said throttle valve member towards said other end of said bore.*

*15. The throttle valve system as claimed in claim 10 wherein said means for maintaining said throttle valve in said zero throttle position during cruise or lift throttle operation comprises a low rate spring urging said throttle valve into said zero throttle position.*

* * * * *